March 16, 1954 D. D. STONE 2,672,056
POWER TAKE-OFF MECHANISM AND DRIVE THEREFOR
Filed Aug. 19, 1950 4 Sheets-Sheet 1
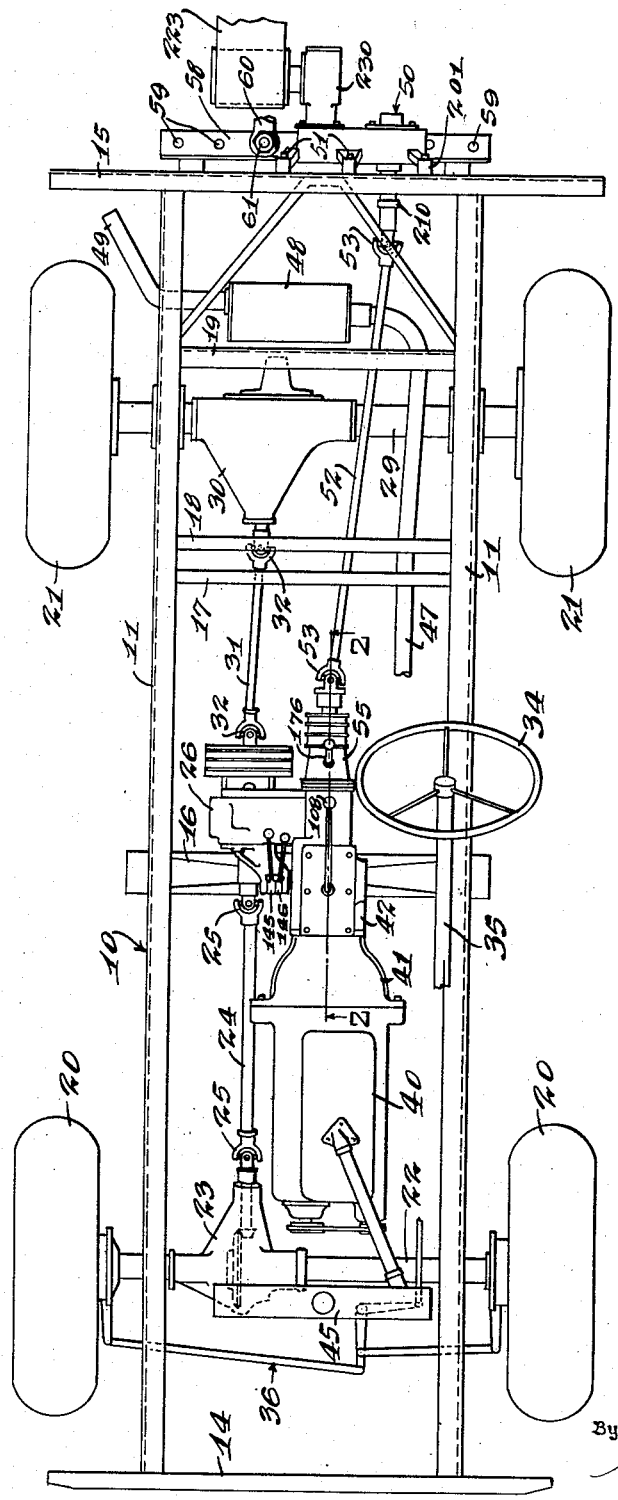
FIG-1-
Inventor
Donald D. Stone
By Harry O. Ernsberger
Attorney

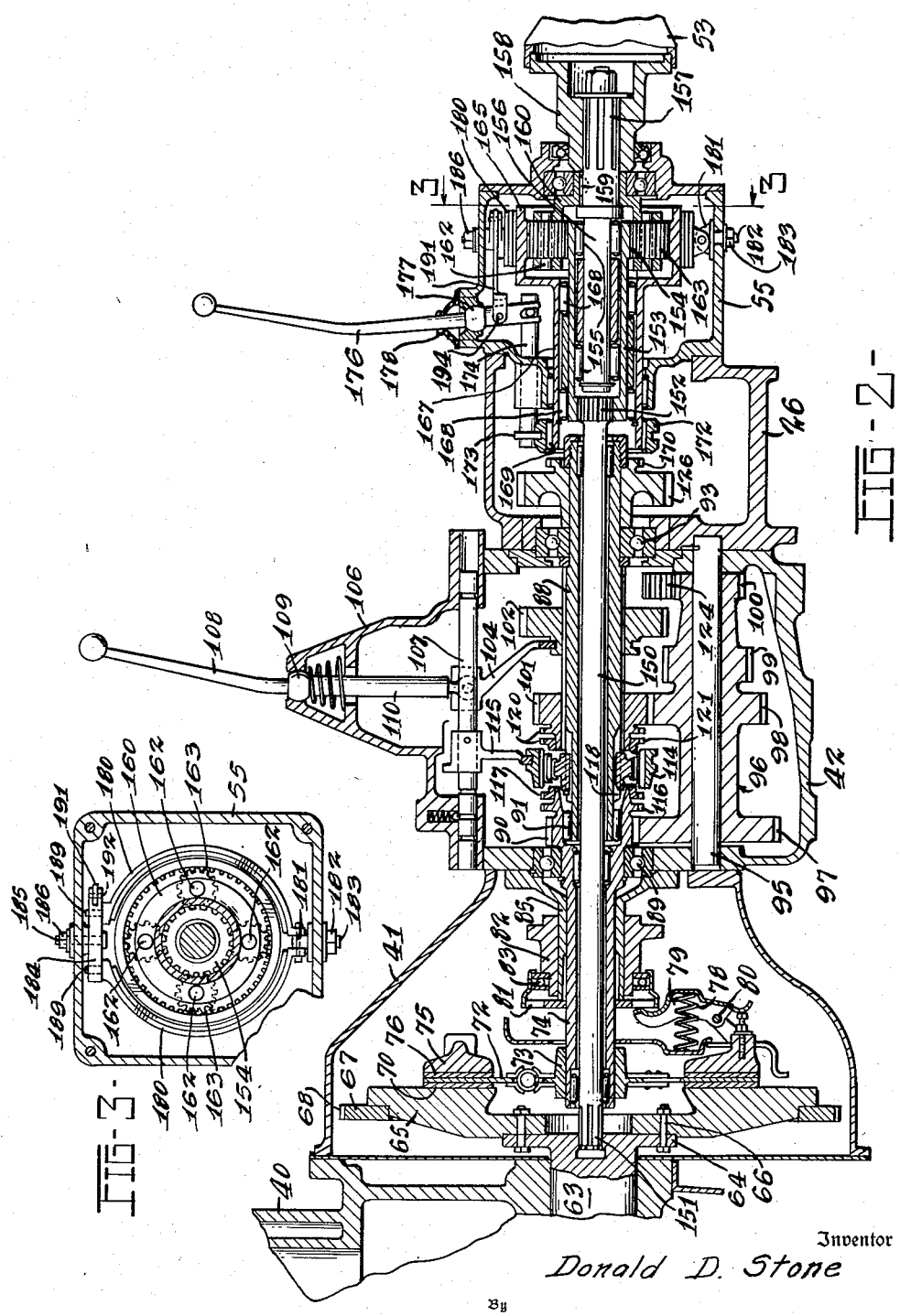

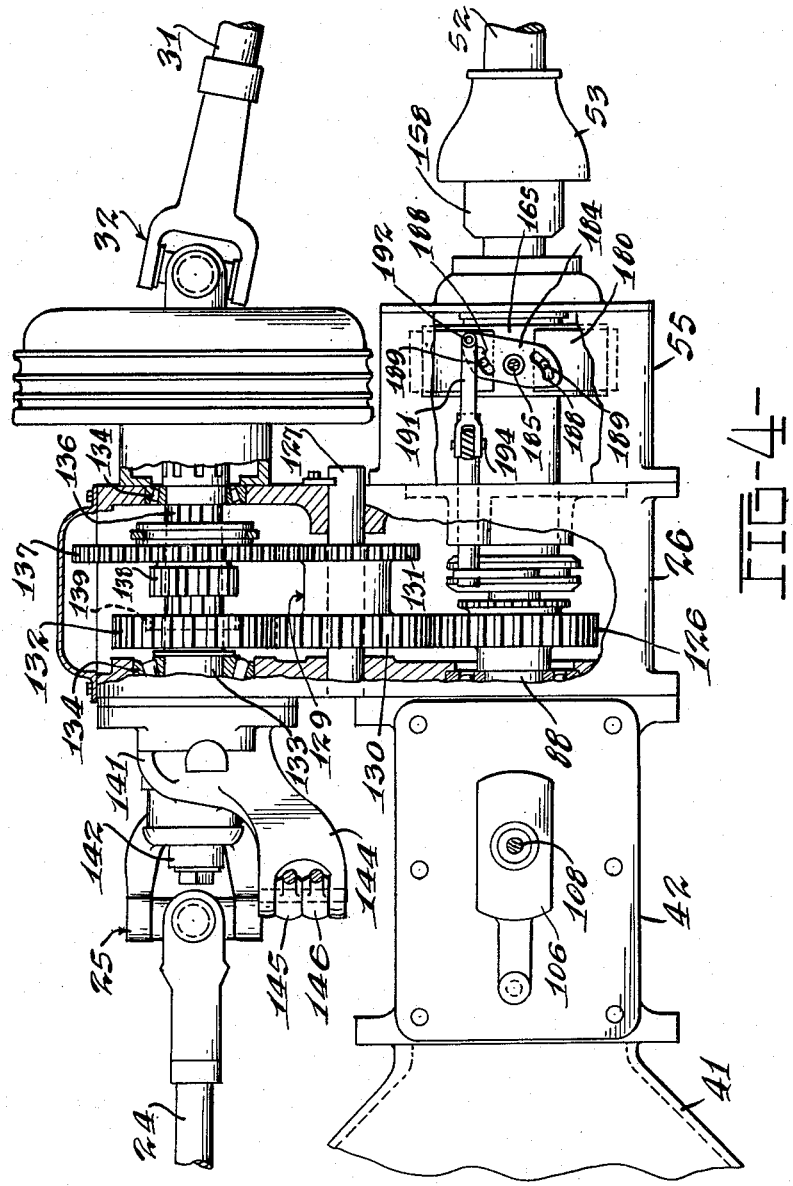

March 16, 1954 D. D. STONE 2,672,056
POWER TAKE-OFF MECHANISM AND DRIVE THEREFOR
Filed Aug. 19, 1950 4 Sheets-Sheet 4
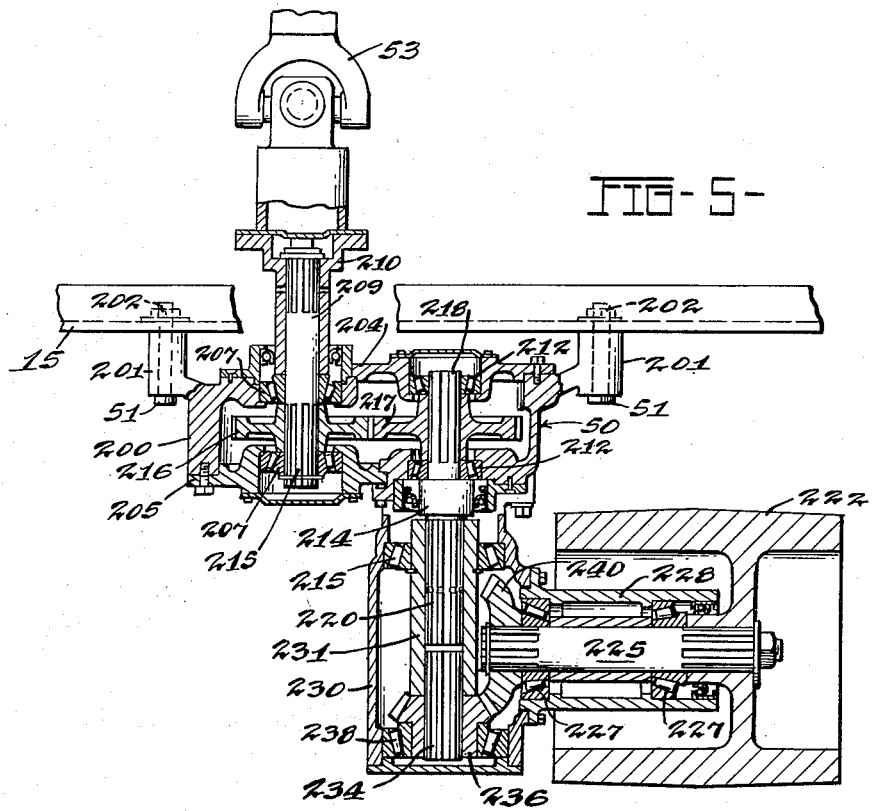
FIG-5-
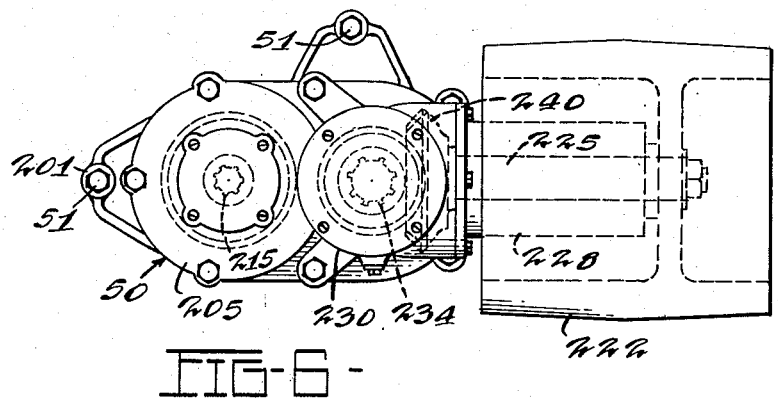
FIG-6-
Inventor
Donald D. Stone
By
Harry O. Ernsberger
Attorney Patented Mar. 16, 1954

2,672,056

UNITED STATES PATENT OFFICE 2,672,056

POWER TAKE-OFF MECHANISM AND DRIVE THEREFOR

Donald D. Stone, Flint, Mich., assignor, by mesne assignments, to Willys Motors, Inc., Toledo, Ohio, a corporation of Pennsylvania Application August 19, 1950, Serial No. 180,328

7 Claims. (Cl. 74—15.4)

This invention relates to power transmission means and especially to an arrangement for the take-off of power in conjunction with the power plant of an automotive vehicle.

Various forms and arrangements of power take-off devices in conjunction with vehicles such as trucks and tractors have been in conventional use for several years. In prior arrangements, the power take-off means or mechanisms have been connected with the power plant or engine through the medium of the vehicle clutch so that the power take-off mechanism is operable for transmitting power to a power consuming implement or instrumentality connected to the vehicle only when the latter is in motion. In such constructions the speed of the power take-off mechanism is proportional to the rate of movement of the vehicle dependent however upon the selected gear ratio employed between the engine and the drive wheels of the vehicle. It has been conventional practice for the power take-off mechanism to be connected to and driven through the intermediary of transmission gearing or gear set assembly. This arrangement renders the operating speed of the implement drawn by the vehicle subservient to the rate of linear travel of the vehicle and implement and when the vehicle and implement are stopped, the transmission of power to the implement is likewise interrupted. Another disadvantage of such power take-off arrangements lies in the fact that it has not been possible to operate the power take-off mechanism at a substantially constant speed for the reason that the speed of the power take-off is dependent upon or proportional to the rate of travel of the moving vehicle. It has been determined that a desirable and satisfactory operating speed of approximately 536 R. P. M. is practicable for operating power consuming implements connected to the vehicle and operated by the engine of the vehicle.

It is an object of the present invention to provide a drive arrangement for the power take-off mechanism operable independently of the drive or power transmission mechanism to the drive wheels of the vehicle whereby the speed of the power take-off arrangement may be had proportionate to the engine speed even though the movement of the vehicle and implement drawn thereby be interrupted by disconnecting the engine from the vehicle drive wheels.

The invention comprehends a power transmission means for a power take-off arrangement which is operable independently of the drive mechanism for the vehicle wheels and which is particularly adaptable for the operation of a farm implement such as a combine, corn picker, sprayer, hay baler and other similar implements adapted to be drawn by a powered vehicle whereby substantially constant speed of the power consuming mechanism of such implements may be maintained independently of the linear movement or travel of the vehicle and implement.

Another object of the invention resides in the provision of a free power take-off drive in which the medium for transmitting power from the engine to the power consuming unit is associated with but driven independently of the power transmission gearing or gear set mechanism for transferring power from the vehicle engine to the vehicle drive wheels.

Another object of the invention resides in a power transmission mechanism for a power consuming unit adapted to be drawn by the vehicle and operated from the engine thereof wherein certain driven elements of the mechanism connecting the engine with the power consuming unit are contained within the housing arrangement enclosing the transmission gearing connecting the engine with the vehicle drive wheels.

A further object of the invention resides in the provision of a power transmitting means for a power consuming unit which is operated directly from the engine of a vehicle independently of a clutch or other power disconnecting means for interrupting the transmission of power from the engine to the vehicle drive wheels.

Still a further object of the invention is the provision of a gear reduction means associated with the power transmission gearing of a powered vehicle for selectively establishing different speed ratios between the engine of the vehicle and a power consuming unit attached thereto whereby the speed of the power consuming unit may be changed with respect to the speed of the engine independently of the movement of or rate of linear travel of the vehicle and power consuming unit connected thereto.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view of a chassis of a vehicle illustrating the engine, the arrangement for transmitting power to the vehicle drive wheels and the arrangement for transmitting power to a power take-off or power consuming unit;

Figure 2 is a longitudinal vertical sectional view through the mechanisms for transmitting power from the engine to the vehicle drive wheels and to the power take-off or power consuming unit, the view being taken substantially on the line 2—2 of Figure 1;

Figure 3 is a transverse sectional view taken substantially on the line 3—3 of Figure 2;

Figure 4 is a top plan view of the housing construction, certain parts being broken away to illustrate the power transmitting mechanism for the vehicle drive wheels and for the power take-off unit;

Figure 5 is a horizontal sectional view through a form of power take-off unit adapted to be driven by the vehicle engine for operating a power consuming instrumentality adapted to be connected to and drawn by the vehicle, and Figure 6 is a rear elevational view of the structure illustrated in Figure 5.

Referring to the drawings in detail, and first to Figure 1, there is illustrated a top plan view of a vehicle chassis with which the arrangement of the present invention has particular utility. The vehicle chassis only has been illustrated, it being understood that any conventional type of body construction embodying seating arrangement for the vehicle operator may be employed. The vehicle chassis illustrated is of the so-called four wheel drive construction, a driving arrangement which is particularly adapted for agricultural and industrial operations where power take-off mechanisms may be employed to advantage. The chassis and running gear construction illustrated in Figure 1 is inclusive of a frame 10 formed with longitudinally extending channel shaped members 11 which are connected together by means of transversely extending end members 14, 15 and intermediate members 16, 17, 18 and 19. The chassis arrangement includes a pair of front drive wheels 20 and a pair of rear drive wheels 21, the front drive wheels 20 being dirigible for steering purposes. The front wheels are supported by a front axle construction 22 which includes a housing 23 enclosing suitable drive gear and differential mechanism connected by means of a drive shaft 24 and universal joints 25 to power transmission mechanism contained within a supplemental transmission housing or transfer case 26 disposed amidship of the vehicle frame.

The rear drive wheels 21 of the vehicle are carried upon an axle construction 29 connected with a housing 30 in which is suitably mounted differential mechanism and drive gearing (not shown) which is connected to suitable power transmission gearing contained in the transfer case 26 by means of a shaft 31 and universal joint 32. The vehicle is provided with a steering wheel 34 mounted upon the upper end of a steering post 35, the wheel 34 being connected through suitable tie rod linkage 36 with the dirigibly mounted front wheels 20. The drive gear and differential mechanism contained in each of the housings 23 and 30 are connected by suitable live axle shafts for driving the vehicle wheels, the live axle shafts contained within the axle construction 22 being connected by suitable universal joints (not shown) to the front wheel supporting spindles whereby an effective drive connection is maintained to the front wheels during dirigible movements thereof.

The vehicle construction is inclusive of a power plant preferably in the form of an internal combustion engine 40 suitably supported by the chassis frame by mounting means (not shown). Disposed rearwardly of the engine 40 is a housing 41 enclosing suitable clutch mechanism and secured to the housing 41 and disposed rearwardly thereof is a housing 42 enclosing main power transmission gearing usually referred to as a gear set. As will hereafter be explained in further detail, the gearing contained within the housing 42 is for the purpose of securing a variable speed ratio between the engine and the drive wheels of the vehicle, the gearing or power transmission mechanism contained within the transfer case 26 providing a means for obtaining exceptionally low drive ratios for the front and rear wheels and for selectively establishing a drive to the front wheels when desired.

The engine 40 is preferably cooled by liquid means, as for example, water which is circulated through a cooling radiator 45 disposed at the forward portion of the vehicle frame. An exhaust pipe 47 is connected to the engine for conveying exhaust gases therefrom and is in communication with a sound attenuating device or muffler 48 to which is connected a tail pipe 49 terminating at the rear portion of the vehicle construction and arranged to discharge the engine exhaust gases into the air.

The arrangement is provided with a power take-off unit 50 preferably mounted at the rear of the vehicle frame, being secured by bolts 51 to the transverse frame member 15. The power take-off unit illustrated in Figures 5 and 6 and which will hereinafter be more fully described contains gearing connected by means of a power take-off shaft 52 and universal joints 53 with mechanism contained within a housing 55 secured to a rear wall of the transfer case 26. A transverse bar 58 secured to the rear vehicle frame construction is provided with suitable openings 59 to which power consuming instrumentalities or implements may be attached to be drawn by the vehicle construction and operated from the power take-off unit 50. As illustrated in Figure 1, a portion of a tow bar 60 is illustrated connected to the bar 58 by means of a bolt or coupling pin 61 the bar 60 being connected to an implement (not shown) to be drawn by the vehicle.

As particularly illustrated in Figure 2 the crankshaft 63 of the engine 40 projects into the housing 41 and is formed with an integral flange 64 to which a flywheel 65 is fixedly secured by means of bolts 66. The periphery of the flywheel is configurated to support an annularly shaped element or ring 67 provided with gear teeth 68 adapted to be engaged by a suitable gear (not shown) for starting the engine 40.

Secured to the rear face of the flywheel 65 is an annular disk-like member 70 which forms an element of a clutch construction for connecting the crankshaft of the engine with the power transmission gearing. Disposed adjacent the disk 70 is a driven disk 72 having a central hub portion 73 keyed, splined or otherwise mounted upon a driven shaft 74 so as to rotate therewith but capable of limited longitudinal or axial movement with respect thereto. A pressure ring 75 having a clutch facing 76 is arranged adjacent the driven disk 72 and normally biassed in a lefthand direction as viewed in Figure 2 under the influence of the expansive springs 78 (one of which is shown in Figure 2).

Three radially extending arms 79, one of which is shown in Figure 2, are pivoted to the pressure ring by means of pivot pins 80 the inner ends of the arms 79 engaging an operating ring 81 which is carried by a clutch shifting collar 82 through the medium of anti-friction bearings 83. The clutch actuating collar 82 is slidably mounted upon a sleeve-like member 85 which surrounds a sleeve-like driven shaft 74. The collar 82 is engaged by a suitable actuating means (not shown) for reciprocating the collar along the sleeve 85, which movement actuates the arms 79 shifting the pressure ring 75 axially for clutching and declutching engagement with the driven disk 72 to establish and disestablish a drive between the crankshaft 63 and the driven shaft 74.

Disposed within the transmission housing 42 is a gear set or gear mechanism for changing the ratio of drive between the shaft 74 and a second sleeve-like shaft 88. The shaft 74 has a portion journalled on anti-friction or ball bearings 89 carried in the forward wall of the transmission housing 42. The shaft 74 is formed with a gear or dental configuration 90 positioned within the housing 42 immediately adjacent the bearing 89. The interior of the gear portion 90 of shaft 74 is bored to accommodate needle bearings 91 which serve to journally support the forward end of the shaft 88. The rear portion of the shaft 88 is journalled in suitable antifriction or ball bearings 93 supported in a forward wall portion of the transfer case housing 26 which is secured to the transmission housing 42.

The transmission mechanism contained in housing 42 is of conventional design and includes a countershaft 95 upon which is journalled a cluster gear 96 comprising gear portions 97, 98, 99 and 100. The gear portion 97 is in constant mesh with the gear portion 99 formed on the driven shaft 74 and as the gear 97 is of greater diameter than the gear 90 the cluster gear 96 will be driven at a reduced speed as compared with that of the driven shaft 74. The gear 98 is in constant mesh with a gear 101 carried by the sleevelike shaft 88. The gear portion 99 is arranged to be selectively enmeshed with a gear 102 which is of larger diameter than gear 99. The gear 102 is engaged by a shifting fork 104 which is mounted upon a shifting rod slidably mounted in a cover portion 106 in spaced relation to and parallel with a similar shifting rod 107 illustrated in Figure 2. A shifting lever 108, swivelly supported by means of a joint 109 in an upwardly extending portion of the transmission cover 106, has a depending portion 110 adapted for selective alternate engagement with the shifter rods to secure different gear ratios for varying the speed of the shaft 88 with respect to the shaft 74.

Means are provided for directly connecting the shaft 74 with the shaft 88 to establish a direct drive from one to the other or for establishing a drive through gears 90, 97, 98 and 101 to provide an intermediate gear ratio usually referred to as "second speed gear." This means is inclusive of an axially slidable internally-toothed clutch 114 which is engaged by a shifter fork 115 mounted upon the shifter rod 107 in a manner whereby reciprocating movement of the rod 107 moves the dental clutch 114 axially of the shafts 74 and 88. A portion of the shaft 74 adjacent the gear 90 is formed with clutch teeth 116, a balking ring 117 being interposed between the dental clutch 114 and the clutch teeth 116 for the purpose of synchronizing the speed of the clutch member 114 immediately prior to its clutching engagement with the teeth 116. This engagement takes place upon movement of the shifter rod 107 in a left-hand direction as viewed in Figure 2. The shiftable clutch member 114 is splined as at 118 with the shaft 88 so that when the dental clutch 114 is engaged with the clutch teeth 116 a direct drive is established from shaft 74 to shaft 88 whereby both shafts travel at the same speed.

The gear member 101 herein referred to as a second speed gear is formed with dental clutch teeth 120 which are adapted to be enmeshed with the dental clutch 114 when the latter is moved in a right-hand direction as viewed in Figure 2 by movement of the shift rod 107 and lever 108. A balking ring 121 is disposed between dental clutch 114 and the gear 101 for synchronizing the speed of clutch member 114 immediately prior to its clutching engagement with the teeth 120. When the clutch 114 is meshed with the teeth 120 a drive at a lower speed than direct drive is established to shaft 88 through gears 90, 97, 98 and 101.

When the gear 102 is enmeshed with gear 99 through the operation of the shifter member 104 the low speed drive is established through gears 90, 97, 99 and 102 to the driven shaft 88, the gear 102 being splined upon the shaft. Due to the relative difference in diameters of gears 99 and 102 the lowest forward speed attainable with the gearing contained in the transmission housing 42 is imparted to the shaft 88.

The gear portion 100 of the cluster gear 96 is in constant mesh with an idler gear 124 which is journalled upon a suitable shaft (not shown) mounted in the housing 42. This gear is for imparting reverse direction of rotation to the shaft 88 and the vehicle drive wheels, the reverse drive being completed by shifting the gear 102 in a right-hand direction as viewed in Figure 2 into enmeshment with the idler gear 124.

The power transmission mechanism for conveying power from shaft 88 to the rear drive wheels 21 or selectively to both rear and front drive wheels is accomplished through the intermediary of so-called transfer case mechanism or gearing contained within an auxiliary housing 26. This mechanism is inclusive of gear 126 fixedly secured upon the rear end of the driven shaft 88 as shown in Figures 2 and 4. An intermediate shaft 127 is supported in boss portions formed on opposite walls of the housing 26 and upon which is journally supported a cluster gear 129 which includes a gear 130 in constant mesh with gear 126, and a second gear 131. The gear 130 is in constant mesh with a driven gear 132 which is journally supported upon a shaft 133 journalled in bearings 134 mounted in opposed walls of the transfer case 26. The shaft 133 is provided with a splined portion 136 upon which is slidably mounted a shiftable gear 137 as illustrated in Figure 4. The gear member 137 is integrally formed with a hub portion configurated with a toothed or dental clutch portion 138 which is adapted, upon slidable movement of the gear 137 in a left-hand direction as viewed in Figure 4, to be enmeshed with a dental clutch configuration 139 formed internally in the gear member 132.

Positioned forwardly of the housing 26 is a supplemental casing 141 which encloses a dental clutch mechanism (not shown) supported upon a shaft 142 which is adapted to be engaged by a slidable clutching element (not shown) carried upon the forward end of the shaft 133 for selectively establishing a drive to the front wheels through the drive shaft 24 and universal joint 25. The supplemental casing 141 is formed with an integral forwardly extending portion 144 upon which is supported lever members 145 and 146 for shifting the clutch member contained within housing 141 for establishing drive connection to the front wheels and for moving the gear member 137 to change the speed ratio of the shaft 133 with respect to the quill shaft 88. The rear end portion of the shaft 133 is connected by means of universal joint 32 and shaft 31 with the drive mechanism for transmission of power to the rear drive wheels 21. When it is desired to drive the front and rear wheels simultaneously, the dental clutch mechanism contained within housing 141 is moved to an operative position, and with the dental clutch 138 of gear member 137 enmeshed with the internal clutch teeth 139 of gear 132, an operative drive is established from shaft 88 through the gears 126, 130, 132 to the front and rear wheels. In this position of the transfer case mechanism, the speed of the drive wheels to the vehicle wheels may be varied by the change gear mechanism contained in the transmission housing 42. When a lower range of speed for the drive wheels of the vehicle is desired as for example, when the vehicle is travelling in snow, sand or muddy terrain or when being used as a draft means for farm implements such as plows, harrows, cultivators and the like, such low range may be attained by shifting the gear member 137 into enmeshment with the gear portion 131 of the cluster gear 129. As the gear 131 is of much lesser diameter than gear 137, shaft 133 is rotated at a reduced speed through gears 126, 130, 131 and 137. The drive through the transfer case to the vehicle wheels may be interrupted by moving the gear member 137 and the toothed clutch 138 formed integrally therewith to an intermediate or neutral position wherein the gear 137 is out of mesh with gear 131 and the clutch 138 is out of engagement with the internal teeth 139 of gear 132.

The aligned shafts 74 and 88 are of tubular quill shape to accommodate a power take-off drive shaft 150, the forward end of which is splined as at 151 for engagement with a reciprocally shaped portion formed in the end portion of the crankshaft 63 so as to establish a constant drive from the engine to shaft 150.

The supplemental casing or housing 55 connected to the transfer case as shown in Figures 2 and 4 encloses mechanism for controlling the transmission of power to the power take-off unit 50 and for changing the speed ratio of the power take-off unit with respect to the engine, this mechanism being operable independently of the speed reduction gearing contained in the housings 26 and 42. With particular reference to Figure 2 the rear end portion of the shaft 150 is formed with an enlarged configuration 152 splined to establish driving engagement with a sleeve 153 the latter being formed with a gear portion 154. Disposed within the interior of the sleeve 153 are sets of needle bearings 155 in which is journalled a stub shaft 156, a portion of the shaft extending rearwardly of the casing 55 being splined as at 157 to fixedly receive a fitting 158 which is connected, through the universal joint 53 and shaft 52, with power take-off unit 50. Secured to the stub shaft 156 by means of a key 159 is a cage or spider 160 carrying a plurality of circumferentially spaced pins or stub shafts 162 which form journal supports for gears 163, the latter being in constant mesh with a gear portion 164 formed interiorly of a drum shaped portion of a member 165. The arrangement of gear 154, gears 163 and the gear portion formed on member 165 form a so-called planetary gear mechanism in which the gears 163 are conventionally referred to as planetary gears. The member 165 is formed with an axially extending sleeve portion 167 which is journally supported upon sets of antifriction or needle bearings 168 surrounding exterior surface of the sleeve 153. The forward end portion of sleeve 167 is formed with a toothed or dental portion 169, the teeth of which are aligned with teeth 170 formed on a hub portion of the transfer case gear 126. Slidably mounted for axial movement with respect to shaft 150 is a clutch member 172 formed with a peripheral groove adapted to receive an actuating fork 173 carried upon a reciprocable shift rod 174. The rod 174 is adapted to be reciprocated so as to move the clutch member 172 into clutching engagement with the teeth 170 so as to establish a drive connection between the gear 126 and shaft 88 with member 165. Means are provided for shifting the rod 174 and clutch 172 which is inclusive of a lever 176 swivelly supported by means of a ball joint 177 carried in an upwardly extending portion of the housing 55. A closure boot 178 of flexible material, as for example, rubber prevents the ingress of foreign matter into the joint structure 177. It will be obvious that swivel movements of the shift lever 176 will actuate the clutch 172.

Means are provided for restraining rotation of member 165 a condition which provides for a reduced speed ratio being imparted to the power take-off unit 50. The restraining means illustrated is in the form of a pair of shoes 180 which are anchored to a member 181 secured to a wall of housing 55 by means of a nut 182 threaded upon a tenon portion 183 of the anchor member. As particularly shown in Figures 3 and 4 there is disposed adjacent the free extremities of the brake shoes 180 a plate or member 184 which is pivotally carried upon a pin 185 secured to the upper wall of the housing 55 by means of a nut 186. The plate 184 is adapted for partial rotary movement about the axis of the supporting pin 185. As particularly illustrated in Figure 4, the plate 184 is formed with a pair of cam slots 188 into which extend pins 189 carried by the brake shoes 180. The contour of the slots 188 is such that partial rotative movement of the plate 184 about the axis of the supporting pin 185 will cause the brake shoes 180 to contract into engagement with the drum portion of the member 165 or be moved out of engagement therewith depending upon the direction of oscillation or rotation of the plate 184.

Means are provided for coordinating the movement of the clutch member 172 with that of the plate 184 for actuating the shoes 180. To accomplish this coordination, an arm or link 191 is pivotally connected at one end by means of a pin 192 with the plate 184, the other end of the link being bifurcated or clevis-shaped to straddle a portion of the lever 176 and is connected thereto by means of a pin 194. Thus when the lever 176 is shifted in a direction to move the clutch member 172 into engagement with the clutch teeth 170 on gear 126 the plate 184 is rotated in a counterclockwise direction as viewed in Figure 4 such rotation causing the cam slot configurations 188 to move the pins 189 in the slots and move the bands or brake shoes 180 outwardly out of frictional engagement with the exterior of the drum shaped portion of member 165 so as to permit the member 165 to be connected with the shaft 88 so that in direct drive position of the gearing in transmission housing 42, the quill shaft 88, and the shaft 150 will rotate at the same speed. As the sleeve 153 is driven directly from shaft 150, the sleeve 153 and member 165 will rotate at the same rate of speed and hence there will be no reduction effected through the planetary gearing contained in the housing 55 and the stub shaft 157 and the power take-off unit 50 will be driven at direct engine speed.

When it is desired to effect a reduction in the speed of the stub shaft 157 and power take-off unit 50 in relation to the speed of the shaft 150, the lever 176 is shifted in the opposite direction to withdraw the clutch member 172 from engagement with the clutch teeth 170 concomitantly with the rotation of plate 184 in a direction to contract the bands 180 into frictional engagement with the drum shaped portion of member 165 to restrict rotation of said member. With the member 165 held against relative rotation, the sleeve 153, being in direct connection with the engine crankshaft through the medium of the shaft 150, is rotated thereby causing relative movement of the planetary gears 163 and the cage or spider 160 imparting a reduced speed to the power take-off output shaft 157.

The lever 176 may be moved to a neutral position wherein the dental clutch 172 is out of operative engagement with the teeth 170 on gear 126 and the clamping shoes 180 out of frictional engagement with the drum or member 165 to discontinue the transmission of power to the shaft 157 and power take-off unit 50.

While it is to be understood that any suitable type or form of power take-off unit may be utilized with the arrangement of the present invention, I preferably employ a power take-off mechanism 50 of the character disclosed in Patent No. 2,464,059, issued March 8, 1949. Figures 5 and 6 illustrate a power take-off mechanism which is inclusive of a housing 200 having boss portions 201 adapted to be secured to the frame cross member 15 by means of bolts 202. The housing 200 is provided with front and rear covers 204 and 205 which are secured to the housing 200 by suitable means. Journaled upon bearings 207 is a shaft 209 connected to a sleeve 210 which in turn is operably associated with the universal joint 53 shown in Figure 1. In this manner the shaft 209 is directly driven by the power take-off drive shaft 52.

Also journaled upon bearings 212 carried by the cover members 204 and 205 is a second shaft 214 disposed in substantially parallel relation with the shaft 209, the shaft 214 projecting rearwardly of the housing 200.

The shaft 209 is provided with a splined portion 215 which supports a gear 216 in constant enmeshment with a gear 217 mounted upon a splined portion 218 of shaft 214. The shaft 214 is also formed with a second splined portion 220 which projects exteriorly of the housing 200 and which is adapted to be connected to mechanism to be driven through the power take-off unit. The splined portion 220 may be arranged to operate a pulley 222 which may be connected by means of a belt 223 with mechanism to be operated such as a power saw or other adjunct requiring the use of power that may be readily furnished by the vehicle engine 40 when the vehicle is not moving. The pulley 222 is securely mounted upon a shaft 225 the axis of which extends substantially at right angles to the axis of the operating shaft 220. The shaft 225 is rotatably journaled in suitable antifriction bearings 227 mounted within a sleeve 228 bolted or otherwise fixedly connected with a supplemental housing 230 enclosing the shaft 220 and bolted to the cover 205.

Disposed within the supplemental housing 230 is an internally splined sleeve 231 adapted to telescope with the splined portion 220 of shaft 214 for establishing a drive connection therewith, the sleeve 231 being journaled in antifriction bearings 232 carried in the supplemental housing 230. A stub shaft 234 having a splined surface telescoped into one end of the sleeve 231 supports a mitre gear 236 having a hub portion journaled in suitable bearings 238 carried in the supplemental housing 230. The gear 236 is enmeshed with a driven mitre gear 240 which is splined upon shaft 225 carried by the sleeve 228.

An operative drive is thus established from the power take-off driving shaft 52, shaft 209, gears 216 and 217, shaft 214, sleeve 231 and gears 236, 240 to drive the pulley 222.

The power take-off unit is especially adapted to operate devices that may be hitched to and towed by the vehicle such as combines, sprayers, corn pickers and other harvesting machinery requiring the independent application of power. The establishment of a drive for such equipment is had through the power take-off unit 50 by removing the supplemental housing 230 which carries the mitre gears 236, 240, shaft 225 and pulley 222. With these elements removed, an internally-splined sleeve-like member (not shown) carried by the apparatus to be attached to and towed by the vehicle, may be telescoped into splined or operative connection with the splined projection 220 formed as an integral part of the shaft 214. In this manner an operative drive arrangement is provided for the adjunct or accessory equipment towed by the vehicle through the shaft 209 gears 216—217 and shaft 214.

The speed of the shaft 214 may be varied by manipulating the shift lever 176 to establish a speed reduction through the mechanism hereinbefore described contained in the housing 55 or for establishing a direct drive from the engine crankshaft through the interenmeshment of the teeth of clutch member 172 with teeth 170 illustrated in Figure 2. By this arrangement in conjunction with the gearing contained in the transmission housing 42, varying speeds may be established for the power take-off unit in addition to the speed reduction obtained by intercalation of the mechanism contained in the housing 55 in the power take-off driving means. The transmission of power to the unit 50 may be interrupted by moving the lever 176 to a central or neutral position.

It is apparent that, within the scope of the invention, modifications and different arrangements may be made other than is herein disclosed, and the present disclosure is illustrative merely, the invention comprehending all variations thereof.

What I claim is:

1. In combination with a vehicle having an internal combustion engine and a power transmission mechanism for conveying power to drive wheels of a vehicle; a power take-off unit supported upon the vehicle; means for driving the power take-off unit from the engine; said means including a shaft driven directly by the engine; a planetary speed changing mechanism adapted to be driven by said shaft; means including a clutch for establishing a direct operative power connection between said power take-off unit and the engine through said planetary mechanism whereby said unit is driven at engine speed, and means operable when said clutch is disengaged to interconnect the planetary mechanism with the power take-off unit whereby the latter is driven at a different speed from that of the engine.

2. In combination with a vehicle having an internal combustion engine and a power transmission mechanism for conveying power to drive wheels of a vehicle; a power take-off unit supported upon the vehicle; means connecting the power take-off unit with the engine; said connecting means including a shaft driven directly by the engine and a planetary speed changing mechanism; a clutching gear carried by said shaft; means including a dental clutch adapted for engagement with said clutching gear for establishing a direct operative power connection between said power take-off unit and the engine through the planetary mechanism; means for operating said dental clutch; said dental clutch operating means being operable to interconnect the planetary mechanism with the power take-off unit whereby the latter is driven at a different speed from that of the engine.

3. In combination with a vehicle having an internal combustion engine provided with a crankshaft and power transmission gearing for conveying power to the drive wheels of the vehicle; a clutch for establishing or disestablishing an operative connection between said power transmission gearing and the engine crankshaft; means for operating said clutch; a power take-off unit carried by the vehicle; means for establishing a connection with the engine crankshaft for operating said power take-off unit; said means including a dental clutch and a planetary gear system; and means operatively associated with said dental clutch operating means and said planetary gear system for establishing a driving connection between the power take-off unit and the engine crankshaft through said planetary gear system whereby the power take-off unit is driven at a different speed from that of the engine crankshaft.

4. In combination with a vehicle having an internal combustion engine provided with a crankshaft and power transmission gearing for conveying power to the drive wheels of the vehicle; a clutch for establishing or disestablishing an operative connection between said power transmission gearing and the engine crankshaft; a power take-off unit carried by the vehicle; means including a planetary gear system for establishing an operative drive connection with the engine crankshaft for operating said power unit at engine crankshaft speed; and manually operable means operatively associated with said planetary gear system for establishing a driving connection between the power take-off unit and the engine crankshaft through said planetary gear system whereby the power take-off unit is driven at a different speed from that of the engine crankshaft.

5. In combination with a vehicle having an internal combustion engine provided with a crankshaft and power transmission gearing for conveying power to the drive wheels of the vehicle; a clutch for establishing or disestablishing an operative connection between said power transmission gearing and the engine crankshaft; a power take-off unit carried by the vehicle; a plantary gear system; dental clutch means for establishing a connection with the engine crankshaft through said planetary gear system for operating said power unit at engine crankshaft speed; and means interconnected with said dental clutch means and operatively associated with said planetary gear system for establishing a driving connection between the power take-off unit and the engine crankshaft through said planetary gear system whereby the power take-off unit is driven at a different speed from that of the engine crankshaft.

6. In combination with a vehicle having an internal combustion engine and power transmission gearing for conveying power to the drive wheels of a vehicle; a clutch for establishing or disestablishing an operative drive connection between the engine and the power transmission gearing; a planetary gear system; a power take-off unit supported upon the vehicle; said power transmission gearing including a quill shaft; a drive shaft contained within said quill shaft directly connected to and adapted to be driven by the engine; a means adapted to establish a drive connection between said engine driven shaft and said planetary gear system for driving the power take-off unit at a speed different from that of the engine driven shaft; said means being movable to a position for establishing a direct drive connection to the power take-off unit from the engine driven shaft; said means being movable to a neutral position for interrupting the transmission of power to the power take-off unit.

7. In combination with a vehicle having an internal combustion engine and power transmission gearing for conveying power to the drive wheels of the vehicle for operating the latter at different speeds; a clutch for establishing or disestablishing an operative drive connection between the engine and the power transmission gearing; a power take-off unit supported upon the vehicle; said power transmission gearing including a quill shaft; a power take-off drive shaft contained within said quill shaft directly connected to and adapted to be driven by the engine; a planetary gear system including a sleeve disposed in alignment with the drive shaft; a drum surrounding the sleeve and having an internal gear formed thereon; a gear formed on said sleeve; a member having a plurality of planetary gears in mesh with said internal gear and the gear on said sleeve; said member being connected to said power take-off unit; dental clutch means for operatively connecting said sleeve and said drive shaft; braking mechanism engageable with said drum for preventing rotation thereof; and means interconnected with said dental clutch means and said brake means for selectively establishing a direct drive from said drive shaft to the power take-off unit or for establishing a drive through said drum to operate said power take-off unit at a speed different from speed of said drive shaft.

DONALD D. STONE.

References Cited in the file of this patent

UNITED STATES PATENTS

| Number | Name | Date |
|---|---|---|
| 1,301,811 | Burgess | Apr. 29, 1919 |
| 2,215,671 | Swennes | Sept. 24, 1940 |
| 2,287,279 | Stumpf | June 23, 1942 |
| 2,306,767 | Wagner | Dec. 29, 1942 |
| 2,325,492 | Erickson | July 27, 1943 |
| 2,428,982 | Miller et al. | Oct. 14, 1947 |
| 2,556,194 | Keese | June 12, 1951 |